US009418618B2

(12) United States Patent
Zhang et al.

(10) Patent No.: US 9,418,618 B2
(45) Date of Patent: Aug. 16, 2016

(54) VIDEO SIGNAL TRANSMISSION APPARATUS, PLAY SYSTEM AND VIDEO SIGNAL TRANSMISSION METHOD

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Lijie Zhang, Beijing (CN); Xiao Zhang, Beijing (CN); Peng Cheng, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/416,462

(22) PCT Filed: Jun. 17, 2014

(86) PCT No.: PCT/CN2014/080114
§ 371 (c)(1),
(2) Date: Jan. 22, 2015

(87) PCT Pub. No.: WO2015/070603
PCT Pub. Date: May 21, 2015

(65) Prior Publication Data
US 2016/0035313 A1 Feb. 4, 2016

(30) Foreign Application Priority Data
Nov. 16, 2013 (CN) .......................... 2013 1 0576716

(51) Int. Cl.
*H04N 7/00* (2011.01)
*H04N 5/38* (2006.01)
(Continued)

(52) U.S. Cl.
CPC ............... *G09G 5/006* (2013.01); *H04N 5/268* (2013.01); *H04N 5/38* (2013.01); *H04N 21/4122* (2013.01);
(Continued)

(58) Field of Classification Search
CPC ....... H04N 5/4401; H04N 7/007; H04N 7/08; H04N 7/081; H04N 7/025; H04N 7/088; H04N 7/0803; H04N 7/015; H04N 5/38; H04N 5/40; H04N 21/2383; H04N 21/4382; H04N 21/4532; H04N 7/163; H04N 21/44222; H04N 21/4542; H04N 21/43635; H04N 21/44231; H04N 21/4516; H04N 21/4122; H04N 21/43632; H04N 21/4402; H04N 5/268
USPC .......................... 348/474, 723, 724, 469, 473
IPC .............................. H04N 5/38, 5/40, 7/04, 7/00
See application file for complete search history.

(56) References Cited

U.S. PATENT DOCUMENTS

2009/0256922 A1* 10/2009 Gersten .................... H04N 5/38
348/723
2010/0185792 A1 7/2010 Yao et al.
2014/0327751 A1* 11/2014 King ........................ H04N 5/38
348/723

FOREIGN PATENT DOCUMENTS

CN 101212587 A 7/2008
CN 101334762 A 12/2008
(Continued)

OTHER PUBLICATIONS

International Search Report Appln. No. PCT/CN2014/080114; Dated Sep. 19, 2014.
(Continued)

Primary Examiner — Sherrie Hsia
(74) Attorney, Agent, or Firm — Ladas & Parry LLP

(57) ABSTRACT

There is provided a video signal transmission apparatus, a play system and a transmission method. The video signal transmission apparatus comprises: a first interface configured to be connected with a video signal source; a second interface configured to be connected with a display device; a signal receiving unit and a control unit arranged between the first interface and the second interface, the control unit being connected with the display device through the second interface and the signal receiving unit being connected with the video signal source through the first interface. The control unit comprises an acquiring module configured to acquire parameter information of the display device and feed acquired parameter information back to the signal receiving unit., the parameter information comprising a video format supported by the display device; the signal receiving unit comprises a converting module configured to convert a received video signal into the video format supported by the display device according to the parameter information. The present disclosure can realize plugging and playing and avoid such problem that the system has a failure of output or disorder of display configuration caused by the hot swap or disconnection with the display device and thus needs to be restarted, and so on.

18 Claims, 2 Drawing Sheets

(51) Int. Cl.
*G09G 5/00* (2006.01)
*H04N 5/268* (2006.01)
*H04N 21/4363* (2011.01)
*H04N 21/442* (2011.01)
*H04N 21/45* (2011.01)
*H04N 21/41* (2011.01)
*H04N 21/4402* (2011.01)
*H04N 21/4408* (2011.01)

(52) U.S. Cl.
CPC ... *H04N 21/43632* (2013.01); *H04N 21/43635* (2013.01); *H04N 21/4402* (2013.01); *H04N 21/44231* (2013.01); *H04N 21/4516* (2013.01); *G09G 2360/02* (2013.01); *G09G 2370/042* (2013.01); *G09G 2370/047* (2013.01); *G09G 2370/12* (2013.01); *G09G 2370/22* (2013.01); *H04N 21/4408* (2013.01)

(56) References Cited

FOREIGN PATENT DOCUMENTS

| | | |
|---|---|---|
| CN | 102455886 A | 5/2012 |
| CN | 102737680 A | 10/2012 |
| CN | 103024366 A | 4/2013 |
| CN | 103595943 A | 2/2014 |

OTHER PUBLICATIONS

Written Opinion of the International Searching Authority Appln. No. PCT/CN2014/080114; Dated Sep. 19, 2014.

First Chinese Office Action dated Apr. 25, 2016; Appln. No. 201310576716.1.

* cited by examiner

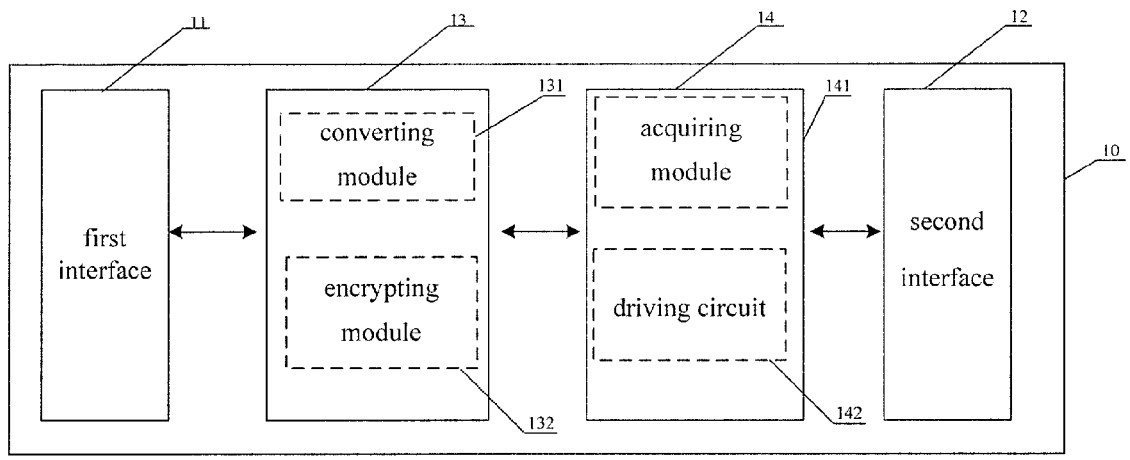
Fig. 3
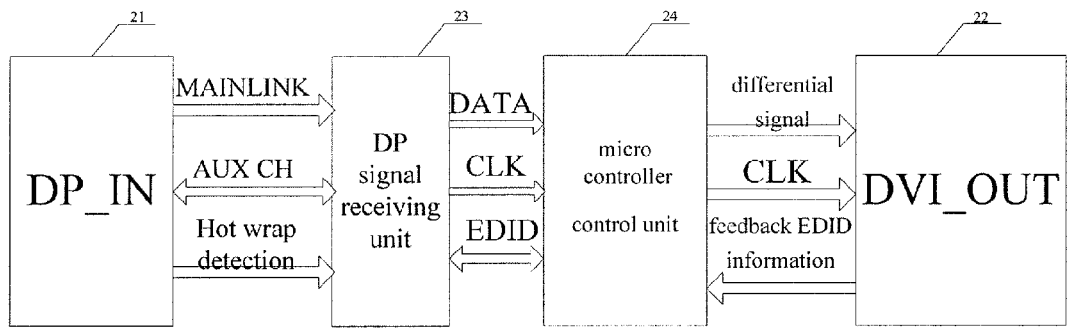
Fig.4
| Acquiring parameter information of a display device, the parameter information comprising a video format supported by the display device |
|---|
| converting a video signal into the video format supported by the display device according to acquired parameter information and outputting the same |
Fig.5

VIDEO SIGNAL TRANSMISSION APPARATUS, PLAY SYSTEM AND VIDEO SIGNAL TRANSMISSION METHOD

TECHNICAL FIELD

The present disclosure relates to a video signal transmission apparatus, a play system and a video signal transmission method.

BACKGROUND

At present, most Ultra HD (high definition) split screen technology is complicated in implementation of data transmission. After a graphics card or video card of a player outputs data, the data needs to be transmitted via a transferring line and a transferring device, so as to realize an ultra high definition display on a display. For example, a common connecting mode is: DP (DisplayPort) interface of the graphics card is connected with EDID (Extended Display Identification Data) chip, and then the EDID chip is connected with the display via the transferring line. The existing mode is not only complicated in connection, but also in the process of data transmission, there may occur a failure of connection such as non-full screen, picture flicker, being unable to display and so on due to damage of a position, hot swap or not being connected with the display.

SUMMARY

According to one aspect of embodiments of the present disclosure, there is provided a video signal transmission apparatus, comprising: a first interface configured to be connected with a video signal source; a second interface configured to be connected with a display device; a signal receiving unit and a control unit arranged between the first interface and the second interface, the control unit being connected with the display device through the second interface, and the signal receiving unit being connected with the video signal source through the first interface.

The control unit comprises an acquiring module configured to acquire parameter information of the display device and feed acquired parameter information back to the signal receiving unit, the parameter information comprising a video format supported by the display device.

The signal receiving unit comprises a converting module configured to convert a received video signal into the video format supported by the display device according to the parameter information.

Optionally, the parameter information is an extended display identification data value of the display device; the acquiring module is a display identification detecting module configured to detect the extended display identification data value of the display device and feed the detected extended display identification data value back to the signal receiving unit.

Further, when the control unit and the display device are disconnected with each other or fail to be connected with each other, the display identification detecting module is further configured to feed information of failing to acquire the extended display identification data value back to the signal receiving unit, and the signal receiving unit is further configured to report the information of failing to acquire the extended display identification data value to the video signal source.

Further, the control unit further comprises a driving circuit configured to strengthen signal driving capability.

Optionally, the driving circuit comprises an operational amplifier.

Optionally, the parameter information is the extended display identification data value of the display device; the converting module is a direct digital control circuit configured to convert the received video signal into the video format supported by the display device according to the extended display identification data value.

Optionally, the signal receiving unit further comprises an encrypting module configured to perform an encrypting process on a converted video signal.

Optionally, there are arranged between the first interface and the signal receiving unit: a main link configured to transmit the video signal; and an auxiliary channel configured to transmit the control signal.

Optionally, the signal receiving unit further comprises a voltage detecting module configured to detect whether an input voltage is a rated voltage.

Optionally, the first interface and/or the second interface is a DisplayPort interface or a high definition multi-media interface HDMI or a digital video interface DVI.

The embodiments of the present disclosure further provide a video signal play system, comprising a display device and the transmission apparatus described above.

The embodiments of the present disclosure further provide a video signal transmission method, comprising: acquiring parameter information of a display device, the parameter information including a video format supported by the display device; and converting the video signal into the video format supported by the display device according to acquired parameter information and outputting the same.

The video signal transmission method, the video signal transmission apparatus and the play system provided in the embodiments of the present disclosure comprise the first interface, the second interface, and the signal receiving unit and the control unit arranged between the first interface and the second interface. The control unit acquires the parameter information of the display device, and the signal receiving unit converts the video signal into the video format supported by the display device according to the acquired parameter information and outputs the converted video signal. From the above process, it can be seen that the transmission method, the transmission apparatus and the display device provided in the embodiments of the present disclosure directly integrate the acquiring module and the converting module into the transmission apparatus, and thus the video signal can be directly transmitted to the display device without any transferring device, so as to realize plugging and playing and reduce interference and loss in the signal transmission process.

In the video signal transmission apparatus, the play system and the video signal transmission method provided in the embodiments of the present disclosure, when the display device or the hot swap is changed, the acquiring module acquires actively the parameter information of the display device, and the converting module converts the received video signal into the video format supported by the display device according to the parameter information, so as to realize locking the video signal source in outputting specified resolution and avoid such problem that the system has a failure of output or disorder of display configuration caused by the hot swap or disconnection with the display device and thus needs to be restarted, and so on.

BRIEF DESCRIPTION OF THE DRAWINGS

In order to describe technical solutions in the embodiments of the present disclosure more clearly. Figures used in the embodiments will be introduced below simply. Obviously, the figures described below are just some embodiments of the present disclosure, and other figures can be obtained according to these figures without paying any inventive labor.

FIG. 3 is a third block diagram of the schematic structure of the transmission apparatus provided in the first embodiment of the present disclosure;

FIG. 4 is a block diagram of a schematic structure of a transmission apparatus provided in a second embodiment of the present disclosure;

FIG. 5 is a schematic flow diagram of a transmission method provided in a third embodiment of the present disclosure.

DETAILED DESCRIPTION

Technical solutions in the embodiments of the present disclosure will be clearly and completely described in combination with the figures in the embodiments of the present disclosure. Obviously, the embodiments described herein are just a part of embodiments of the present disclosure, but not all the embodiments of the present disclosure. Based on the embodiments of the present disclosure, all the other embodiments obtained by those skilled in the art without paying any inventive labor shall fall into the protection scope of the present disclosure.

First Embodiment

Figure 1:
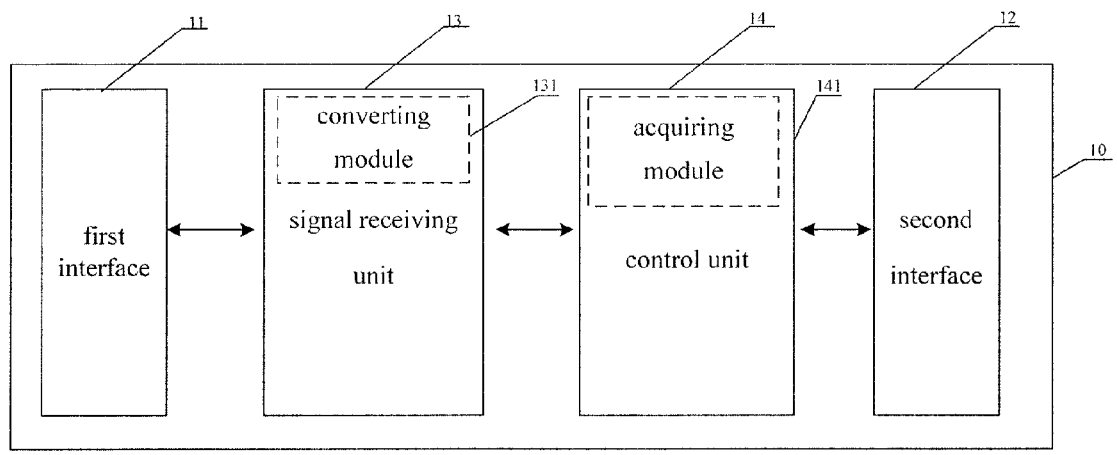
FIG. 1 is a first block diagram of a schematic structure of a transmission apparatus provided in a first embodiment of the present disclosure.

The first embodiment of the present disclosure provides a video signal transmission apparatus. As shown in FIG. 1, the video signal transmission apparatus comprises: a first interface 11, a second interface 12, a signal receiving unit 13 and a control unit 14.

The first interface 11 is configured to be connected with the video signal source. The second interface 12 is configured to be connected with the display device.

The signal receiving unit 13 and the control unit 14 are arranged between the first interface 11 and the second interface 12. The control unit 14 is connected with the display device through the second interface 12, and the signal receiving unit 13 is connected with the video signal source through the first interface 11.

As shown in FIG. 1, the control unit 14 can comprise an acquiring module 141. The acquiring module 141 can be configured to acquire parameter information of the display device and feed acquired parameter information back to the signal receiving unit 13. The parameter information includes a video format supported by the display device. As an example, the parameter information can comprise but not limited to line frequency, field frequency, and resolution and refresh rate and so on.

As shown in FIG. 1, the signal receiving unit 13 can comprise a converting module 131. The converting module 131 can be configured to convert the received video signal into the video format supported by the display device according to the parameter information. In other words, the converting module 131 equivalently realizes locking the video signal source to output the video format supported by the display device.

The video signal source can be a high definition play source. In general, the first interface 11 can refer to an output interface of the graphics card of the video signal source. The first interface 11 includes but not limited to a DisplayPort interface (DP interface) or a high definition multi-media HDMI interface or a digital video DVI interface. It is described below by taking the first interface 11 adopting the DP interface as an example.

Specifically, the second interface 12 can be configured to be connected with a signal input terminal of the display device. Likewise, the second interface 12 includes but not limited to a DisplayPort interface (DP interface) or a high definition multi-media HDMI interface or a digital video DVI interface. It is described below by taking the second interface 12 adopting the DVI interface as an example.

In the video signal transmission apparatus provided in the first embodiment of the present disclosure, the acquiring module configured to acquire the parameter information of the display device through the second interface and the converting module configured to convert the video signal are integrated into the transmission apparatus. Therefore, the video signal can be directly transmitted to the display device by only the video signal transmission apparatus, without any transferring device, to realize plugging and playing, and reduce interference and loss in the process of signal transmission. At the same time, the problem that the system has a failure of output or disorder of display configuration caused by the hot swap or disconnection with the display device and thus needs to be restarted.

The first embodiment of the present invention does not limit the implementation way of the acquiring module 141 and the converting module 131 (i.e., how to acquire the parameter information of the display device, and how to convert the received video signal into the video format supported by the display device), which can be any implementation ways well known for those skilled in the art. Only one implementation way is taken as an example below.

In the exemplary implementation, the information of the video format supported by the display device can be obtained by means of acquiring an extended display identification data value (EDID value), that is, the parameter information in the first embodiment is the extended display identification data value (EDID value) of the display device. The extended display identification data (EDID) is a VESA standard data format comprising parameters related to a monitor and its performance, which include vendor information, size of the largest image, color setting, manufacturer presets, limitation to frequency range and display name and character string of serial number. The latest version of EDID can be used in CRT, LCT and future display types, because EDID provides a general description of almost all the display parameters.

In the exemplary implementation, the acquiring module 141 can be a display identification detecting module. The display identification detecting module is configured to detect the extended display identification data value of the display device and feed the detected extended display identification data value back to the signal receiving unit 13. The converting module 131 can be a direct digital control circuit (DDC circuit). The direct digital control circuit is configured to convert the received video signal into the video format supported by the display device based on the extended display identification data value. The DDC circuit is a common module in the art, its structure and operation process is common knowledge in the art, and thus the details are not described herein.

Further, when the control unit 14 and the display device are disconnected with each other or fail to be connected with each other, that is, when the control unit 14 fails to acquire information of the extended display identification data value, the display identification detecting module is further configured to feed information of failing to acquire the extended display identification data value back to the signal receiving unit 13, and the signal receiving unit 13 is further configured to report the information of failing to acquire the extended display identification data value to the video signal source. After that, the video signal source determines to continue detecting or stop transmitting the video signal.

Figure 2:
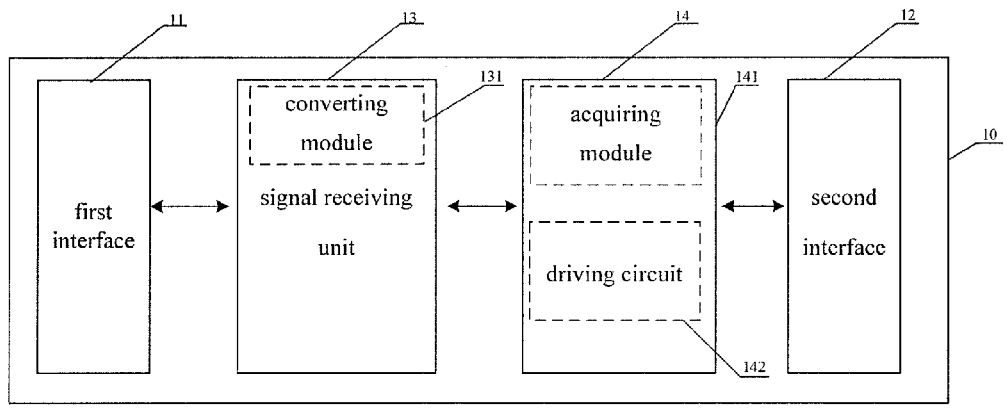
FIG. 2 is a second block diagram of the schematic structure of the transmission apparatus provided in the first embodiment of the present disclosure.

In addition, as shown in FIG. 2, optionally, the control unit 14 can further comprise a driving circuit 142 configured to strengthen signal driving capability. Optionally, the driving circuit 142 can be consisted of an operational amplifier with high speed and high accuracy. The video signal output from the converting module 131 is amplified by the driving circuit 142, and then output to the display device through the second interface 12. By strengthening the signal driving capability, signal attenuation in the transmission process can be reduced, which is advantageous for a long-distance transmission.

In addition, as shown in FIG. 3, optionally, the signal receiving unit 13 can further comprise an encrypting module 132 configured to perform an encryption process on the converted video signal, so as to better protect the content to be transmitted.

The video signal transmission apparatus provided in the first embodiment of the present disclosure converts the format of the video signal output from the video signal source according to the video format supported by the display device, and then the video signal can be equivalently made to be locked in outputting specified resolution and/or a refresh rate by simulating the display signal required by the display device. The video signal transmission apparatus can be compatible with all the display devices and display cards on the market, set resolution and refresh rate as required, assist in mass production test, accelerate the time for launching products on the market, and reduce loss of the test equipment and decrease cost.

In another aspect, the video signal transmission apparatus provided in the first embodiment of the present disclosure simulates EDID information of the display device and lock the graphics card (video signal source) output to avoid the problem that the system has a failure of output or disorder of display configuration caused by the hot swap or disconnection with the display device and thus needs to be restarted.

In yet another aspect, the video signal transmission apparatus provided in the first embodiment of the present disclosure solves the problem of output signal attenuation due to long distance by strengthening the output of the graphics card, which is capable of preventing the problem of abnormal picture or display asymmetry of the video signal caused by long-distance transmission loss from occurring.

Second Embodiment

The second embodiment of the present disclosure provides a video signal transmission apparatus as shown in FIG. 4. The second embodiment differs from the first embodiment in: the first interface is replaced with a DP_IN module 21; the signal receiving unit is replaced with a DP signal receiving unit 23; the control unit is replaced with a micro controller control unit 24 consisted of micro controllers; the second interface is replaced with a DVI_OUT module 22.

The DP_IN module 21 is a currently general purpose DP interface and is configured to be connected with the video signal source (such as the graphics card). The DP_IN module 21 comprises a data pin, a hot swap detection and a power supply pin, a high speed video and an audio transmission pin and so on. The DVI_OUT module 22 is a standard DVI interface and is configured to be connected with the display device. The DVI_OUT module 22 comprises a data transmission pin and a clock pin and so on.

There are arranged between the DP_IN module 21 (equivalent to the first interface) and the DP signal receiving unit 23: a main link (MAIN LINK) configured to transmit the video signal; and an auxiliary channel (AUX CH) configured to transmit a control signal (such as a timing signal, a clock signal and so on). In addition, the control signal can comprise the parameter information of the display device transmitted from the DP signal receiving unit 23 to the DP_IN module 21.

The DP signal receiving unit 23 comprises the main link (MAIN LINK), the auxiliary channel (AXU CH), a voltage detection module, and a direct digital control circuit DDC circuit. The voltage detecting module is configured to detect whether or not the input voltage meets the requirement of the display device. In general, the rated voltage is 5V. The DDC circuit further comprises circuit modules of EDID identification, storage, chromaticity space conversion and so on. The DDC circuit is a key element for the system to realize control function, and its operation process is as follows: the DDC circuit collects real-time data through an analogy input channel (AI) and digital input channel (DI), converts an analogy signal into a digital signal that can be accepted by the computer (A/D conversion), then performs operations according to certain control rules, finally sends out a control signal and convert the digital signal into the analogy signal (D/A conversion), and directly controls operation of the video signal transmission apparatus through an analogy output channel (AO) and a digital output channel (DO). There is integrated an internal EDID dynamic memory (EDID RAM) in the video signal transmission apparatus which is configured to store EDID information. After receiving the video signal, the DP signal receiving unit 23 can perform a chromaticity space conversion through a color converting module built in the circuit (using the chromaticity space conversion to complete a corresponding conversion of a reference chromaticity space in different display modules so as to satisfy display requirements for different display devices), and transmit the video signal in a form suitable to the DVI channel or transmit the video signal to a terminal to be displayed via other interfaces through a transferring adaptor, such as HDMI, VGA, DVI and so on. Further, the signal can be encrypted before being transmitted, so as to better protect the content to be transmitted.

The micro controller control unit 24 comprises functional modules of identifying EDID, data processing, a driving circuit configured to strengthen signal driving and so on, and performs the following functions: detecting EDID information transmission and feeding back it to an upper layer of circuit (the DP signal receiving unit 23) to be processed; ensuring that the video display device supports a correct video format; forcing an output of a correct video and audio frequency or refresh rate; storing the identified EDID information in a dynamic memory of the DP signal receiving unit 23, i.e., EDID RAM, and in the case of the hot swap, the micro controller control unit 24 can also read EDID information from EDID RAM, so as to guarantee a normal output of the signal. The micro controller control unit 24 further comprises the driving circuit for strengthening the signal driving capability. The driving circuit is mainly consisted of an operational amplifier with high speed and high accuracy and is configured to reduce signal loss in the transmission process, which is advantageous for long-distance transmission.

The micro controller control unit 24 can ensure that the video display device supports the correct video standard, which can be output through DVI link. Once the DP signal receiving unit 23 reads EDID content, it can only select the standard that is supported by the video display device and lock and force the output of the required resolution and refresh rate and so on.

Since the existing device may render that the signal fails to be identified in the case of the hot swap, which results in system disorder, in order to solve the problem, there is arranged a display identification detecting module in the micro controller control unit 24. The display identification detecting module can identify (or detect) EDID information of different display devices inserted therein and feed back the information so as to realize real-time adjustment to meet the requirements of display at the terminal. The specific feedback and adjustment process is as follows: the micro controller control unit 24 can deliver the detected EDID information to EDID RAM in the DP signal receiving unit 23 to be stored, and the DP signal receiving unit 23 can convert the video signal by reading the EDID information at any time. Furthermore, in the case of the hot swap, the EDID RAM information can be read to guarantee the normal output of the signal.

In addition to the above, the video signal transmission apparatus provided in the second embodiment of the present disclosure has the following advantages: when the video signal transmission apparatus is applied, the requirement for the transferring line and the transferring device is small and no external power supply is needed, which reduces the cost for the video signal transmission apparatus and directly realizes digital signal transmission from a player (video signal source) to a display device, so that the interference and loss is small in the signal transmission process. In addition, the video signal transmission apparatus only comprises the optimal resolution and refresh rate of the current display device, and thus avoid a series of problems that occur in hot swap of the debug process and realize plugging and playing; only two interfaces DP and DVI are needed, and it is compatible with all DVI graphics cards and display devices on the market.

To sum up, the video signal transmission apparatus provided in the second embodiment of the present disclosure addresses defects of complexity, instability, signal attenuation, and large consumption for the transferring lines and so on in a traditional 4K/2K video play system. In the case of hot swap of the display device, an output of a signal from the video signal source is not affected, it is ensured that no signal loses and long-distance transmission of the signal can be realized.

In addition, the second embodiment of the present disclosure further provides a video signal play system, comprising a display device and further comprising the video signal transmission apparatus of any one of the first and second embodiments. The video signal transmission apparatus can simulate EDID information of the display device and lock the output of the graphics card (video signal source), to realize plugging and playing and avoid the problem that the system has a failure of output or disorder of display configuration caused by the hot swap or disconnection with the display device and thus needs to be restarted. In addition, the video signal transmission apparatus can further solve the problem of transmission signal attenuation due to long distance, which is capable of effectively preventing the problem of abnormal picture or display asymmetry of the video signal caused by long-distance transmission loss from occurring.

Third Embodiment

The third embodiment of the present disclosure provides a video signal transmission method as shown in FIG. 5. In a first step, there acquires parameter information of a display device, the parameter information comprising a video format supported by the display device. In a second step, there converts the video signal into the video format supported by the display device according to acquired parameter information.

The video signal transmission method provided in the embodiment of the present disclosure converts the video signal into the video format supported by the display device according to the acquired parameter information and then outputs the same, which can directly transmit the video signal to the display device, so as to realize plugging and playing and reduce interference and loss in the signal transmission process.

The video signal transmission method provided in the embodiment of the present disclosure can be used to realize locking the video signal source in outputting specified resolution and avoid the problem that the system has a failure of output or disorder of display configuration caused by the hot swap or disconnection with the display device and thus needs to be restarted.

The respective embodiments in the specification are described in a progressive way, and the same or similar parts between the respective embodiments can refer to each other. Each embodiment focuses on description of differences from other embodiments. In particular, for a method embodiment, since it is basically similar to an apparatus embodiment, it is described simply, and related descriptions can refer to a part of description of the method embodiment.

Those ordinary skilled in the art can understand that implementation of all or part of flows in the method of the above embodiments can be completed through setting a computer program to instruct related hardware. The program can be stored in a computer readable storage medium and can comprise the flows of the embodiments of the respective method described above when being executed. Herein, the storage medium may be a disk, an optical disk, a read-only memory (ROM) or a random access memory (RAM) and so on.

The above descriptions are just specific implementations of the present disclosure, but the protection scope of the present disclosure shall not be limited thereto. Alternation or replacement which is easily conceivable for any one skilled in the art who is familiar with the technical field within the technical scope disclosed in the present disclosure shall be covered within the protection scope of the present disclosure. Therefore, the protection scope of the present disclosure shall be subject to the protection scope of the claims.

The present application claims a priority of a Chinese priority application filed on Nov. 16, 2013, with an application number of 201310576716.1 and an invention title of "video signal transmission apparatus, play system and video signal transmission method", and all of its contents are incorporated herein by reference.

What is claimed is:

1. A video signal transmission apparatus, comprising:
a first interface configured to be connected with a video signal source;
a second interface configured to be connected with a display device;
a signal receiving unit and a control unit arranged between the first interface and the second interface, the control unit being connected with the display device through the second interface and the signal receiving unit being connected with the video signal source through the first interface;
wherein the control unit comprises an acquiring module configured to acquire parameter information of the display device and feed acquired parameter information back to the signal receiving unit, the parameter information comprising a video format supported by the display device;
the signal receiving unit comprises a converting module configured to convert a received video signal into the video format supported by the display device according to the parameter information,
wherein when the control unit and the display device are disconnected with each other or fail to be connected with each other, the acquiring module is further configured to feed information of failing to acquire the parameter information of the display device back to the signal receiving unit, and the signal receiving unit is further configured to report the information of failing to acquire the parameter information of the display device to the video signal source.

2. The video signal transmission apparatus according to claim 1, wherein the parameter information is an extended display identification data value of the display device; the acquiring module is a display identification detecting module configured to detect the extended display identification data value of the display device and feed the detected extended display identification data value back to the signal receiving unit.

3. The video signal transmission apparatus according to claim 1, wherein the control unit further comprises a driving circuit configured to strengthen signal driving capability.

4. The video signal transmission apparatus according to claim 3, wherein the driving circuit comprises an operational amplifier.

5. The video signal transmission apparatus according to claim 1, wherein the parameter information is the extended display identification data value of the display device; the converting module is a direct digital control circuit configured to convert the received video signal into the video format supported by the display device according to the extended display identification data value.

6. The video signal transmission apparatus according to claim 1, wherein the signal receiving unit further comprises an encrypting module configured to perform an encrypting process on a converted video signal.

7. The video signal transmission apparatus according to claim 1, wherein there are arranged between the first interface and the signal receiving unit:
 a main link configured to transmit the video signal; and
 an auxiliary channel configured to transmit a control signal.

8. The video signal transmission apparatus according to claim 1, wherein the signal receiving unit further comprises a voltage detecting module configured to detect whether an input voltage is a rated voltage.

9. The video signal transmission apparatus according to claim 1, wherein the first interface and/or the second interface is a DisplayPort interface or a high definition multi-media interface HDMI or a digital video interface DVI.

10. A video signal play system, comprising a display device and the video signal transmission apparatus according to claim 1.

11. The video signal play system according to claim 10, wherein the parameter information is an extended display identification data value of the display device; the acquiring module is a display identification detecting module configured to detect the extended display identification data value of the display device and feed the detected extended display identification data value back to the signal receiving unit.

12. The video signal play system according to claim 10, wherein the control unit further comprises a driving circuit configured to strengthen signal driving capability.

13. The video signal play system according to claim 12, wherein the driving circuit comprises an operational amplifier.

14. The video signal play system according to claim 10, wherein the parameter information is the extended display identification data value of the display device; the converting module is a direct digital control circuit configured to convert the received video signal into the video format supported by the display device according to the extended display identification data value.

15. The video signal play system according to claim 10, wherein the signal receiving unit further comprises an encrypting module configured to perform an encrypting process on a converted video signal.

16. The video signal play system according to claim 10, wherein there are arranged between the first interface and the signal receiving unit:
 a main link configured to transmit the video signal; and
 an auxiliary channel configured to transmit a control signal.

17. The video signal play system according to claim 10, wherein the signal receiving unit further comprises a voltage detecting module configured to detect whether an input voltage is a rated voltage.

18. A video signal transmission method, comprising:
 acquiring parameter information of a display device, the parameter information including a video format supported by the display device;
 when acquiring of the parameter information of the display device is succeeded, converting video signal received from a video signal source into the video format supported by the display device according to acquired parameter information and outputting the same; and
 when acquiring of the parameter information of the display device is failed, reporting the information of failing to acquire the parameter information of the display device to the video signal source.

* * * * *